(12) United States Patent
Josten (10) Patent No.: US 6,952,707 B1
(45) Date of Patent: Oct. 4, 2005

(54) EFFICIENT SEQUENCE NUMBER GENERATION IN A MULTI-SYSTEM DATA-SHARING ENVIRONMENT

(75) Inventor: Jeffrey William Josten, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 09/694,185

(22) Filed: Oct. 23, 2000

Related U.S. Application Data (63) Continuation-in-part of application No. 09/330,865, filed on Jun. 11, 1999.

(51) Int. Cl.[7] .............................................. G06F 17/30
(52) U.S. Cl. ........................ 707/104.1; 707/8; 707/202
(58) Field of Search ............................ 707/104.1, 100, 707/8, 10, 202, 207

(56) References Cited

U.S. PATENT DOCUMENTS

| | | | |
|---|---|---|---|
| 4,488,232 A | | 12/1984 | Swaney et al. |
| 5,043,866 A | * | 8/1991 | Myre et al. .................. 707/202 |
| 5,151,988 A | | 9/1992 | Yamagishi |
| 5,220,665 A | | 6/1993 | Coyle, Jr. et al. |
| 5,333,303 A | * | 7/1994 | Mohan ......................... 714/20 |
| 5,371,886 A | | 12/1994 | Britton et al. |
| 5,499,367 A | | 3/1996 | Bamford et al. |
| 5,504,899 A | | 4/1996 | Raz |
| 5,504,900 A | | 4/1996 | Raz |
| 5,581,750 A | | 12/1996 | Haderle et al. |
| 5,590,318 A | * | 12/1996 | Zbikowski et al. .......... 707/202 |
| 5,636,360 A | * | 6/1997 | Courts et al. ................ 711/145 |
| 5,640,561 A | | 6/1997 | Satoh et al. |
| 5,701,454 A | | 12/1997 | Bhargava et al. |

(Continued)

FOREIGN PATENT DOCUMENTS

| | | |
|---|---|---|
| JP | 55-091037 | 7/1980 |
| JP | 02-230343 | 9/1990 |
| JP | 03-098128 | 4/1991 |
| JP | 03-266161 | 11/1991 |
| JP | 07-084953 | 3/1995 |
| JP | 08-036547 | 2/1996 |

OTHER PUBLICATIONS

Youngkon Lee et al., "Commit–order Oriented Validation Scheme for Transaction Scheduling in Mobile Distributed Database Systems: COOV,", IEICE Transactions on Information and Systems, vol. E80–D, No. 1 (pp 10–14), Jan. 1997 (1 page Abstract only).

Kwok Wa Lam et al., "Optimistic Concurrency Control Protocol for Real–time Databases", Journal of Systems and Sofware, vol. 38, No. 2, pp. 119–131, Aug. 1997, (1 page Abstract only).

Youngkon Lee et al., "Commit–reordering Validation Scheme for Transaction Scheduling in Client–server Based Teleputing Systems: COREV.", Korea Adv. Inst. of Sci. & Technology, Seoul, South Korea: Proceeding of the 6th International Conference on Information and Knowledge Management, CIKM '97, pp. 59–66, Published: New York, NY, USA, 1997, (1 page Abstract only).

*Primary Examiner*—Wayne Amsbury
*Assistant Examiner*—CamLinh Nguyen
(74) *Attorney, Agent, or Firm*—Gates & Cooper LLP (57) ABSTRACT

A method, apparatus, article of manufacture, and data structure for use in efficiently generating sequence numbers in a multi-system data-sharing environment. Sequence number assignment logic, performed by a computer system, generates a recoverable, unique sequence number for assignment to an application, wherein the sequence number is contained in a control page stored in a database on a data storage device coupled to the computer system and shared with other computer systems, and updates to the control page are serialized across all of the computer systems.

41 Claims, 4 Drawing Sheets

U.S. PATENT DOCUMENTS

| | | |
|---|---|---|
| 5,701,480 A | 12/1997 | Raz |
| 5,734,898 A | 3/1998 | He |
| 5,761,667 A | 6/1998 | Koeppen |
| 5,778,388 A * | 7/1998 | Kawamura et al. ......... 707/203 |
| 5,832,203 A | 11/1998 | Putzolu et al. |
| 5,855,012 A | 12/1998 | Bhargava et al. |
| 5,862,318 A | 1/1999 | Habben |
| 5,878,056 A * | 3/1999 | Black et al. ................. 714/748 |
| 6,135,646 A * | 10/2000 | Kahn et al. ................. 709/217 |
| 6,363,372 B1 * | 3/2002 | Lichterman .................... 707/3 |

* cited by examiner

EFFICIENT SEQUENCE NUMBER GENERATION IN A MULTI-SYSTEM DATA-SHARING ENVIRONMENT

CROSS-REFERENCE TO RELATED APPLICATION

This application is a continuation-in-part of the following co-pending and commonly-assigned patent application:

Application Ser. No. 09/330,865, entitled "ASSIGNING RECOVERABLE UNIQUE SEQUENCE NUMBERS IN A TRANSACTION PROCESSING SYSTEM", filed Jun. 11, 1999, by Jeffrey W. Josten, Chandrasekaran Mohan, and Inderpal S. Narang, which application is incorporated by reference herein.

BACKGROUND OF THE INVENTION

1. Field of the Invention

The present invention generally relates to computer-implemented transaction processing systems, and in particular, to a method for efficient sequence number generation in a multi-system data-sharing environment.

2. Description of Related Art

A database management system (DBMS) usually assigns a unique sequence number (SN) to fields, records, etc. Generally, the SNs comprise values assigned a monotonically increasing value in an ascending sequence, although they can encompass other values and sequences as well.

A problem arises, however, in that the sequence number assignment is an update operation to a record which is locked until the assignment completes. This serializes other applications that also use the sequence number assignment, because they wait for the updated record to be unlocked in order to receive their sequence number assignment. In a multi-system DBMS environment, e.g., where there is data sharing, an update of this record causes serialization across all systems, which inhibits throughput. Furthermore, if a system were to fail while holding the lock on the record, other systems are prevented from accessing the record until restart recovery is performed for the failed system, which inhibits availability.

Thus, there is a need in the art for improved techniques for assigning sequence numbers without serialization.

SUMMARY OF THE INVENTION

To overcome the limitations in the prior art described above, and to overcome other limitations that will become apparent upon reading and understanding the present specification, the present invention discloses a method, apparatus, article of manufacture, and data structure for use in efficiently generating sequence numbers in a multi-system data-sharing environment.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention discloses a method that efficiently assigns recoverable, unique, monotonically-increasing sequence numbers in a multi-system data-sharing environment. Such sequence numbers are often used for database management systems (DBMS's), and other applications.

The sequence numbers in the present invention have no restrictions on their size, or their values. Moreover, a failure of any system does not affect the ability of the other surviving systems to continue generating unique sequence numbers, thereby supporting high availability.

Hardware Environment

Figure 1:
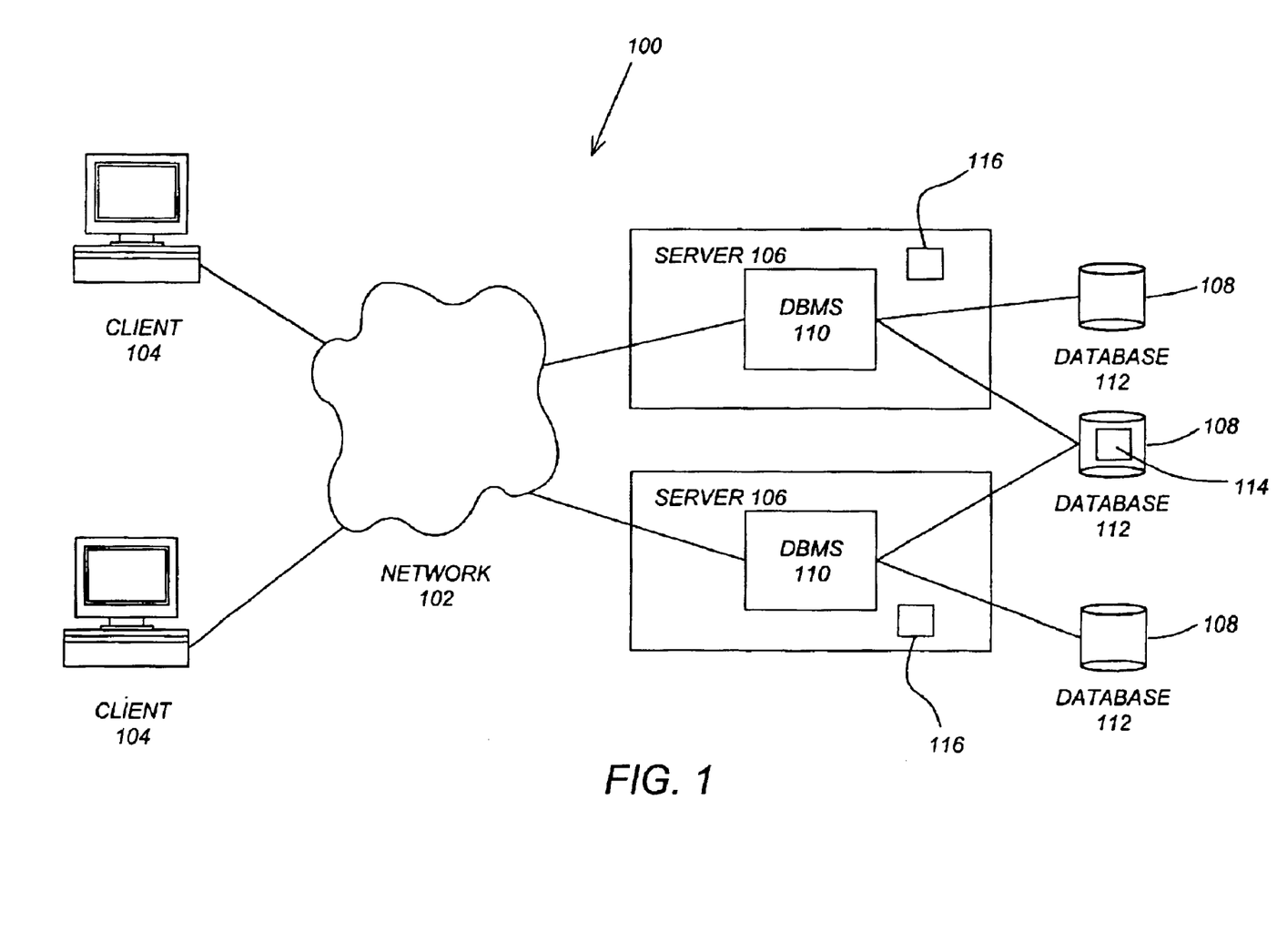
FIG. 1 schematically illustrates the environment of the preferred embodiment of the present invention.

FIG. 1 schematically illustrates the environment of the preferred embodiment of the present invention, and more particularly, illustrates a typical distributed computer system 100 using a network 102 to connect one or more clients 104 to multiple servers 106 coupled to one or more direct access storage devices (DASDs) 108. The network 102 may comprise networks such as LANs, WANs, SNA networks, and the Internet. A typical combination of resources nay include clients 104 that are implemented on personal computers or workstations, and servers 106 that are implemented on personal computers, workstations, minicomputers, or mainframes.

In a preferred embodiment, each of the servers 106 execute a Database Management System (DBMS) 110, which may access shared and non-shared databases 112 stored on the DASDs 108. Moreover, in the present invention, the DBMS 10 controls access to one or more control pages 114 stored in a catalog within a shared database 112, wherein each of the control pages 114 is used to control the generation and assignment of a recoverable, unique, monotonically-increasing sequence number. All or portions of the control pages 114 may be stored in a data structure 116 in the memory of the servers 106 in order that each instance of the DBMS 110 may access the information stored therein.

Generally, the DBMS 110, databases 112, control pages 114, and data structures 116 are embodied in and/or readable from devices, carriers, media, or signals, such as a memories, data storage devices, and/or remote devices coupled to the computer via data communications devices. Thus, the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality.

Of course, those skilled in the art will recognize many modifications may be made to this configuration without departing from the scope of the present invention. In addition, those skilled in the art will recognize that any combination of the above components, or any number of different components, including different computers, computer programs, peripherals, and other devices, may be used to implement the present invention, so long as similar functions are performed thereby.

The Control Page

Figure 2:
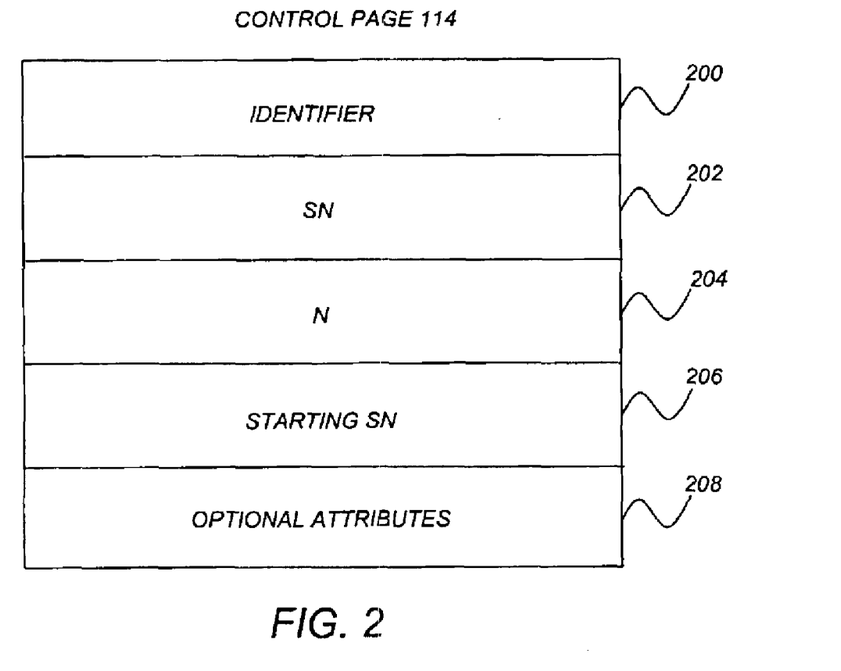
FIG. 2 illustrates a control page used in the preferred embodiment of the present invention.

FIG. 2 illustrates the control page 114 that is used in the preferred embodiment of the present invention. The control page 114 stores the sequence number and related attributes, including an identifier 200, a sequence number (SN) 202, a range value (N) 204, a starting sequence number (Starting SN) 206, as well as optional attributes 208.

In the preferred embodiment, the identifier 200 is a user-defined value that identifies the use for the SN 202. Any number of different identifier 200 values could be used, without departing from the scope of the present invention. The identifier 200 is usually (but not always) a string value.

In the preferred embodiment, the SN 202 is the last number that could possibly have been assigned by any instance of the DBMS 110. The SN 202 maybe comprised of any number of bits (or bytes or words), so that the SN 202 values are not limited in any way. Generally, the values are assigned in ascending sequence, although any number of different values could be used without departing from the scope of the present invention.

In the preferred embodiment, the range value stored in N 204 is the number of reserved SN 202 assignments that can be made by each instance of the DBMS 110 without accessing the control page 114. N 204 can be initially derived internally by the DBMS 110, or it can be derived from a user-specified value.

In the preferred embodiment, the value stored in Starting SN 206 is the starting value for SN 202 assignments. Starting SN 206 can be initially derived internally by the DBMS 110, or it can be derived from a user-specified value.

Finally, the control page 114 may include any number of optional attributes 208. Moreover, these optional attributes 208 may comprise any number of different data types.

The Data Structure

Figure 3:
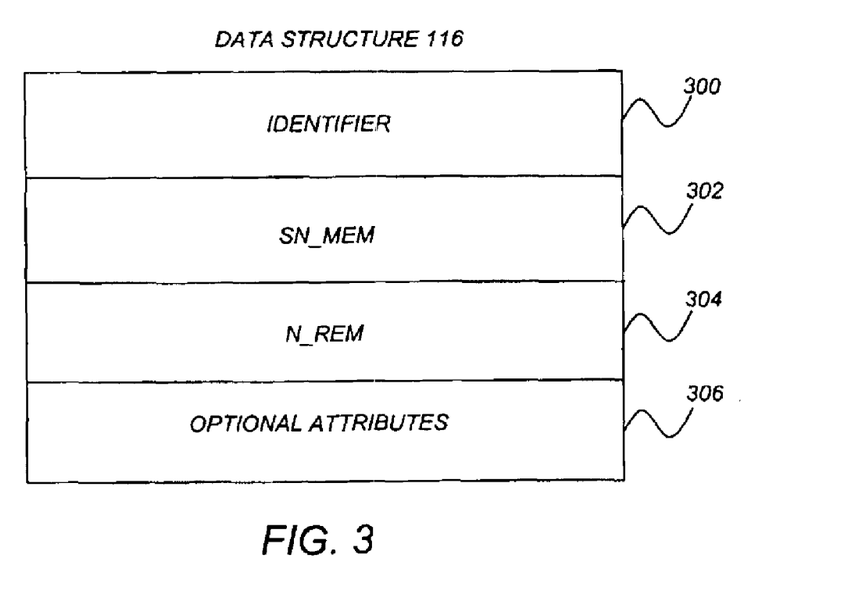
FIG. 3 illustrates an in-memory data structure used in the preferred embodiment of the present invention.

FIG. 3 illustrates the data structure 116 that is used in the preferred embodiment of the present invention. The data structure 116 stores the sequence number and related attributes, including an identifier 300, a sequence number value (SN_MEM) 302, a "number remaining" value (N_REM) 304, as ell as optional attributes 306.

In the preferred embodiment, the identifier 300 is a user-defined value that identifies the use for the SN_MEM 302 and is matched to a corresponding identifier 200 in the control page 114. Any number of different identifier 300 values could be used, without departing from the scope of the present invention. The identifier 300 is usually (but not always) a string value.

In the preferred embodiment, the SN_MEM 302 is the last assigned SN from this instance of the DBME 110. The SN_MEM 302 maybe comprised of any number of bits (or bytes or words), so that the SN_MEM 302 values are not limited in any way. Generally, the values are assigned in ascending sequence, although any number of different values could be used without departing from the scope of the present invention.

In the preferred embodiment, the N_REM 304 is the number of reserved SN_MEM 302 assignments that can be made by this instance of the DBMS 110 without accessing the control page 114. N_REM 304 is initially derived from N 204.

Finally, the data structure 116 may include any number of optional attributes 306. Moreover, these optional attributes 306 may comprise any number of different data types.

Assignment of the Sequence Numbers

In the preferred embodiment, a control page 114 is stored in a catalog of the database 112 for each SN 202 that may be defined for one or more applications. For example, there night be an SN 202 that is defined for an "order number" field, another SN 202 for a "part number" field, yet another SN 202 for an "invoice number" field, and so on.

Preferably, the DBMS 110 includes a Data Definition Language (DDL) that allows the user to define the SNs 202, and to specify the attributes of the control page 114 for each SN 202 (e.g., the identifier 200, current SN 202, range value N 204, starting SN 206, and optional attributes 208). When the SN 202 is first defined, the DBMS 110 initializes the control page 114, and stores the Starting SN 206 value on the control page 114.

During operations, the control page 114 is retrieved from the database 112, the information from the control page 114 is stored in the data structure 116 in the memory of each of the servers 106, and the control page 114 is updated. Periodically, the control page 114 maybe checkpointed, i.e., saved, to the database 112 on the DASD 108, in order to effect a "hardening" of the control page 114. Generally, this checkpointing is performed by the DBMS 110, in order to provide a protected environment for the control page 114.

Redo log records are written as each server 106 updates the SN value in the control page 114. These log records are used for media recovery or restart recovery to reconstruct the SN 202 value in case of failures.

The logic for assigning the next SN involves latching the SN_MEM 302 from the data structure 116, and then using a Compare Double and Swap (CDS) or Compare and Swap (CS) instruction (or similar logic) to atomically read and increment the SN_MEM 302. Similarly, a Compare Double and Swap (CDS) or Compare and Swap (CS) instruction (or similar logic) is used to atomically read and decrement the N_REM 304. After the SN_MEM 302 has been assigned N 204 times, i.e., N_REM 304 reaches zero, then the DBMS 110 instance must access and update the control page 114 to reserve the next range of SN values, wherein the range is indicated by N 204.

Note that in a multi-system data-sharing environment, multiple DBMS 110 instances reserve a range of SN values from the same control page 114, and the use of ranges provides the necessary control over the assignment of SN values. Once a range of SN values has been reserved to the DBMS 110 instance, the SN 202 of the control page 114 is updated to reflect the starting point for the next of SN values. For strict ordering of SN 202 assignments across servers 106, a value of 1 for N 204 can be used.

In the preferred embodiment, a P-lock (physical lock) is used to control this access and update to the control page 114 across servers 106. The P-lock is not a "modify" lock, which means that if a server 106 fails while holding the P-lock, the P-lock will not be retained, and thus other servers 106 will not be prevented from continuing to generate new SNs 202, even when the server 106 that is currently holding the P-lock fails.

Because the P-lock is non-modify, the control page 114 must be written to external storage (e.g., a coupling facility or DASD 108) and the local copies on the control page 114 in other servers 106 must be invalidated before the server 106 making the update starts assigning any new SN 202 values. Using a Write Ahead Logging (WAL) protocol, a redo log record is forced to a log file before the control page 114 is written. Alternatively, if the P-lock is made to be a modify lock the control page 114 does not need to be immediately written.

With regard to the checkpointing, the control page 114 may be updated in the database 112 on the DASD 108 after each access and update of the control page 114 by an instance of the DBMS 110 to get the next range of SN values indicated by SN 202 and N 204. Of course, alternative embodiments could update the control page 114 in the database 112 at other intervals as well.

The following example further describes the assignment of SN values according to the preferred embodiment of the present invention. In this example, first and second DBMS 110 instances assign SN values from the same control page having an identifier "S1", an SN of 1, an N of 20, and a Starting SN of 1. The first DBMS 110 instance reserves a range of SN values from 1–20, and the second DBMS 110 instance reserves a range of SN values from 21–40. Both the first and second DBMS 110 instances maintain their own data structures 116, including the SN_MEM 302 to indicate the next SN value to assign and N_REM 304 to identify when the range of reserved SN values has been exhausted. As each DBMS 110 instance exhausts its range of reserved SN values, when N_REM 304 reaches zero, the control page 114 is accessed and updated (under the control of a P-lock) to obtain the next range of SN values, e.g., the first DBMS 110 instance might exhaust its range first, and it would access and update the control page 114 to reserve the next range of 20 SN values, i.e., where the SN values range from 41–60. The P-lock enforces that only one DBMS 110 instance can update the control page 114 at a time.

Note that, while the first DBMS 110 instance is accessing and updating the control page 114, it cannot assign new SN values. However, the second DBMS 110 instance can continue to assign SN values from its data structure 116. Of course, if the second DBMS 110 instance also exhausts its range of SN values, then it also must access and update the control page 114 to reserve the next range of 20 SN values. The P-lock ensures that the updates performed by the first and second DBMS 110 instances to the control page 114 are properly serialized.

Logic for Assigning Sequence Numbers

The following flowcharts describe the processing and logic of initializing the control page 114, assigning the SNs 202, and hardening the control pages 114. This logic is referred to as the NUMA (NUMber Assignment) logic.

Sequence Number Assignment

Figure 4:
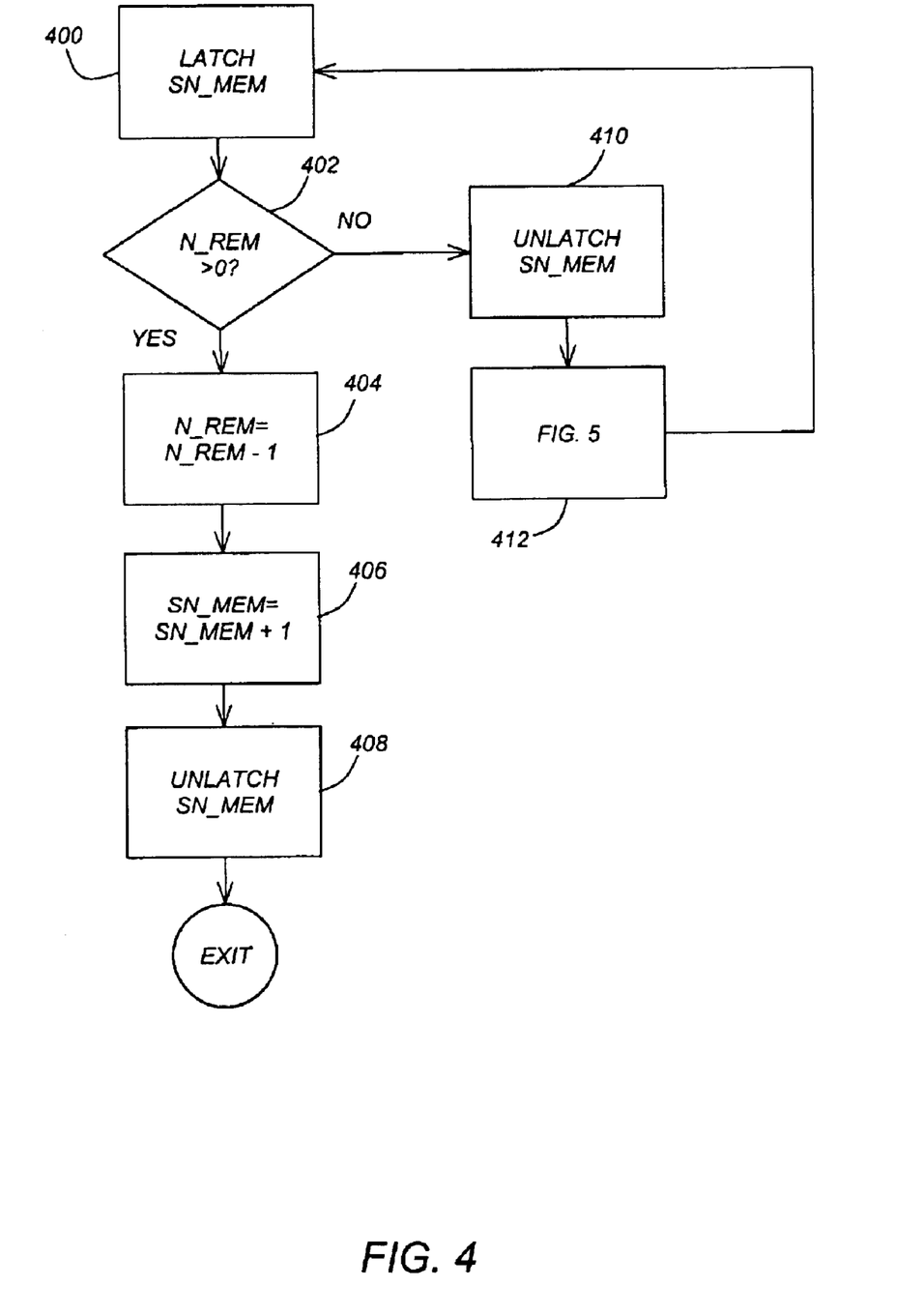
FIG. 4 is a flowchart that illustrates the logic performed in assigning sequence numbers from the data structure according to the preferred embodiment of the present invention.

FIG. 4 is a flowchart that illustrates the logic performed in assigning SN_MEM 302 from the data structure 116 according to the preferred embodiment of the present invention.

Block 400 represents the DBMS 110 latching SN_MEM 302.

Block 402 is a decision block that represents the DBMS 110 determining whether N_REM 304 is greater than 0. If so, control transfers to Block 404; otherwise, control transfers to Block 410.

Block 404 represents the DBMS 110 decrementing N_REM 304.

Block 406 represents the DBMS 110 incrementing SN_REM 302.

Block 408 represents the DBMS 110 unlatching the SN_MEM 302. Thereafter, the logic terminates.

Block 410 represents the DBMS 110 unlatching the SN_MEM 302.

Figure 5:
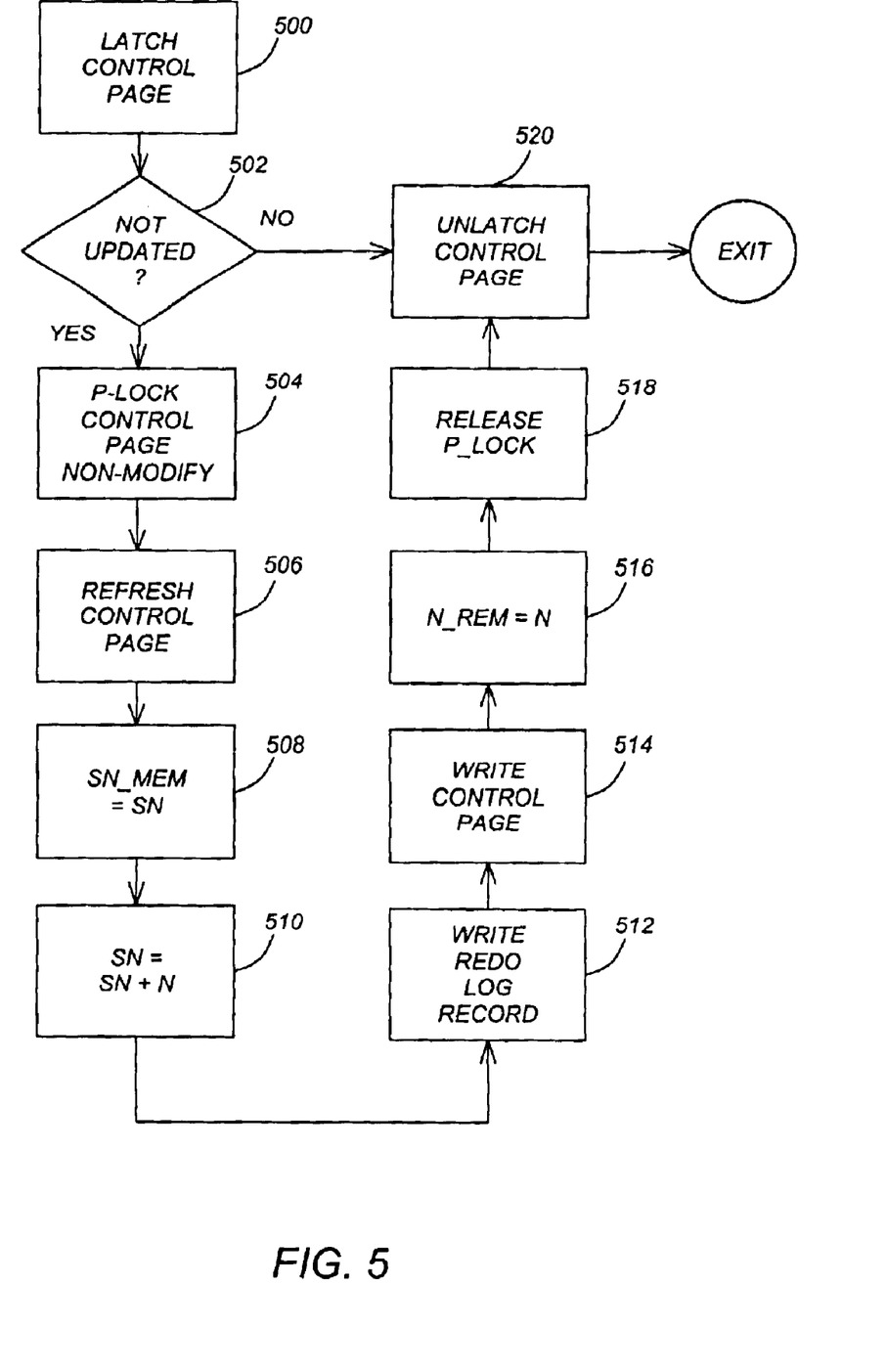
FIG. 5 is a flowchart that illustrates the logic performed in accessing a next range of sequence number values according to the preferred embodiment of the present invention.

Block 412 represents the DBMS 110 retrieving the next range of "N" sequence number values from the control page 114, as described in FIG. 5. Thereafter, control transfers to Block 400.

Retrieve Next Range of Sequence Numbers

FIG. 5 is a flowchart that illustrates the logic performed when retrieving the next range of "N" sequence number values from the control page 114 according to the preferred embodiment of the present invention.

Block 500 represents the DBMS 110 latching the control page 114.

Block 502 is a decision block that represents the DBMS 110 determining whether the control page 114 is not yet updated. If so, control transfers to Block 504; otherwise, control transfers to Block 520.

Block 504 represents the DBMS 110 P-locking (non-modify) the control page 114.

Block 506 represents the DBMS 110 refreshing the control page 114, if the local buffer storing the control page 114 has been invalidated due to the control page 114 on the DASD 108 being updated from another system.

Block 508 represents the DBME 110 setting SN_MEM 302 equal to SN 202.

Block 510 represents the DBMS 110 adding the amount N 204 to SN 202.

Block 512 represents the DBMS 110 writing a redo log record into a transaction log, wherein the redo log record provides a restart capability for the sequence number assignment logic.

Block 514 represents the DBMS 110 writing the control page 114 to the DASD 108, and then invalidating any copies of the control page 114 stored on other servers 106. This can be done, for example, in an IBM S/390 with one "write-data" request to the coupling facility between servers 106.

Block 516 represents the DBMS 110 setting N_REM 304 to N 204.

Block 518 represents the DBMS 110 releasing the P-lock on the control page 114.

Block 520 represents the DBMS 110 unlatching the control page 114.

Thereafter, the logic terminates.

Conclusion

This concludes the description of the preferred embodiment of the invention. One of the advantages of the present invention is that sequence numbers can be easily shared among multiple systems, unlike prior art systems that handle only a single system. In addition, a large number of different sequence numbers can be assigned, simply by defining multiple control pages. Moreover, the present invention deals well with failure recovery issues, in that the sequence numbers can be recovered from the control page in the database after a crash. Also, the size of the sequence number is not limited, as in prior art systems.

In summary, the present invention comprises a method, apparatus, article of manufacture, and data structure for use in efficiently generating sequence numbers in a multi-system data-sharing environment.

The following describes some alternative ways of accomplishing the present invention. Those skilled in the art will recognize that the present invention could be used in any type of computer system. Those skilled in the art also will recognize that different operating environments, transaction processing systems, database management systems, applications, etc., could be substituted for the systems described herein. In addition, those skilled in the art will recognize that the present invention could be used with many types of applications, and need not be limited to the example database management systems described herein.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented system for assigning sequence numbers, comprising:
    (a) a computer system; and
    (b) sequence number assignment logic, performed by the computer system, for generating a recoverable, unique sequence number for assignment to an application, wherein the sequence number is contained in a control page stored in a database on a data storage device coupled to the computer system and shared with other computer systems, and updates to the control page are serialized across all of the computer systems.

2. The system of claim 1, wherein the control page includes one or more attributes selected from a group of attributes comprising an identifier, the sequence number (SN), a range value (N), and a starting sequence number (Starting SN).

3. The system of claim 2, wherein the identifier is a user-defined value that identifies a user for the sequence number.

4. The system of claim 2, wherein a value stored in N identifies a range of sequence number assignments.

5. The system of claim 1, wherein one or more attributes from the control page are stored in a data structure that is stored in the computer system.

6. The system of claim 5, wherein the data structure includes one or more attributes selected from a group of attributes comprising a sequence number (SN_MEM) and a "number remaining" value (N_REM).

7. The system of claim 6, wherein a value stored in N_REM indicates when a range of sequence numbers should be obtained from the control page.

8. The system of claim 1, wherein the control page is periodically saved to the data storage device, in order to effect a hardening of the control page.

9. The system of claim 1, wherein the sequence number assignment logic further comprises logic for latching the sequence number to serialize generation of the sequence number within the computer system.

10. The system of claim 1, wherein the sequence number assignment logic further comprises logic for physically locking the control page to serialize updates to the control page across multiple computer systems.

11. The system of claim 10, wherein the physical lock is not maintained when the computer system fails, so that other computer systems are not prevented from continuing to generate new sequence numbers.

12. A method of assigning sequence numbers in a computer-implemented system, comprising:
    (a) generating a recoverable, unique sequence number using sequence number assignment logic performed by a computer system for assignment to an application; and
    (b) storing the sequence number in a control page, wherein the control page is stored in a database on a data storage device coupled to the computer system and shared with other computer systems, and updates to the control page are serialized across all of the computer systems.

13. The method of claim 12, wherein the control page includes one or more attributes selected from a group of attributes comprising an identifier, the sequence number (SN), a range value (N), and a starting sequence number (Starting SN).

14. The method of claim 13, wherein the identifier is a user-defined value that identifies a use for the sequence number.

15. The method of claim 13, wherein a value stored in N identifies a range of sequence number assignments.

16. The method of claim 12, wherein one or more attributes from the control page are stored in a data structure that is stored in the computer system.

17. The method of claim 16, wherein the data structure includes one or more attributes selected from a group of attributes comprising a sequence number (SN_MEM) and a "number remaining" value (N_REM).

18. The method of claim 17, wherein a value stored in N_REM indicates when a range of sequence numbers should be obtained from the control page.

19. The method of claim 12, wherein the control page is periodically saved to the data storage device, in order to effect a hardening of the control page.

20. The method of claim 12, wherein the sequence number assignment step further comprises latching the sequence number to serialize generation of the sequence number within the computer system.

21. The method of claim 12, wherein the sequence number assignment step further comprises physically locking the control page to serialize updates to the control page across multiple computer systems.

22. The method of claim 21, wherein the physical lock is not maintained when the computer system fails, so that other computer systems are not prevented from continuing to generate new sequence numbers.

23. An article of manufacture embodying logic for performing a method of assigning sequence numbers in a computer-implemented system, the method comprising:
    (a) generating a recoverable, unique sequence number using sequence number assignment logic performed by a computer system for assignment to an application; and
    (b) storing the sequence number in a control page, wherein the control page is stored in a database on a data storage device coupled to the computer system and shared with other computer systems, and updates to the control page are serialized across all of the computer systems.

24. The of manufacture of claim 23, wherein the control page includes one or more attributes selected from a group of attributes comprising an identifier, the sequence number (SN), a range value (N), and a starting sequence (Starting SN).

25. The article of manufacture of claim 24, wherein the identifier is a user-defined value that identifies a use for the sequence number.

26. The article of manufacture of claim 24, wherein a value stored in N identifies a range of sequence number assignments.

27. The article of manufacture of claim 23, wherein one or more attributes from the control page are stored in a data structure that is stored in the computer system.

28. The article of manufacture of claim 27, wherein the data structure includes one or more attributes selected from a group of attributes comprising a sequence number (SN_MEM) and a "number remaining" value (N_REM).

29. The article of manufacture of claim 28, wherein a value stored in N_REM indicates when a range of sequence numbers should be obtained from the control page.

30. The article of manufacture of claim 23, wherein the control page is periodically saved to the data storage device, in order to effect a hardening of the control page.

31. The article of manufacture of claim 23, wherein the sequence number assignment step further comprises latching the sequence number to serialize generation of the sequence number within the computer system.

32. The article of manufacture of claim 23, wherein the sequence number assignment step further comprises physically locking the control page to serialize updated to the control page across multiple computer systems.

33. The article of manufacture of claim 32, wherein the physical lock is not maintained when the computer system fails, so that other computer systems are not prevented from continuing to generate new sequence numbers.

34. A data structure by a sequence number assignment logic performed by a computer system, the data structure comprising:

a control page that contains a sequence number that has no restrictions on its size, an identifier that is a user-defined value that identifies a use for the sequence number, a range value (N) that identifies a range of sequence number assignments, and a starting sequence number (Starting SN) that comprises an initial value for the sequence number, wherein the control page is stored in a database on a data storage device coupled to the computer system and shared with other computer systems, and update to the control page are serialized across all of the computer systems.

35. The data structure of claim 34, wherein one or more attributes from the control page are stored in an in-memory data structure in the computer system.

36. The data structure of claim 35, wherein the in-memory data structure includes one or more attributes selected from a group of attributes comprising a sequence number (SN_MEM) and a "number remaining" value (N_REM).

37. The data structure of claim 36, wherein a value stored in N_REM indicates when a range of sequence numbers should be obtained from the control page.

38. The data structure of claim 35, wherein the control page is periodically saved to a data storage device, in order to effect a hardening of the control page.

39. The data structure of claim 35, wherein the sequence number is latched to serialized generation of the sequence number within the computer system.

40. The data structure of claim 35, wherein the control page is physically locked by a computer system to serialize updates to the control page across multiple computer systems.

41. The data structure of claim 40, wherein the physical lock is not maintained when the computer system fails, so that other computer systems are not prevented from continuing to generate new sequence numbers.

\* \* \* \* \*

UNITED STATES PATENT AND TRADEMARK OFFICE
CERTIFICATE OF CORRECTION

PATENT NO. : 6,952,707 B1 Page 1 of 1
APPLICATION NO. : 09/694185
DATED : October 4, 2005
INVENTOR(S) : Josten It is certified that error appears in the above-identified patent and that said Letters Patent is hereby corrected as shown below:

Column 8,
Line 61, after "The" insert -- article --.

Column 9,
Line 23, "updated" should read -- updates --.

Column 10,
Line 7, "updated" should read -- updates --.

Signed and Sealed this

Twentieth Day of June, 2006

JON W. DUDAS
*Director of the United States Patent and Trademark Office*